United States Patent
Samson et al.

(10) Patent No.: US 6,971,034 B2
(45) Date of Patent: Nov. 29, 2005

(54) POWER/PERFORMANCE OPTIMIZED MEMORY CONTROLLER CONSIDERING PROCESSOR POWER STATES

(75) Inventors: Eric C. Samson, Folsom, CA (US); Aditya Navale, El Dorado Hills, CA (US); Richard Jensen, Fair Oaks, CA (US); Siripong Sritanyaratana, Union City, CA (US); Win S. Cheng, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 471 days.

(21) Appl. No.: 10/340,020

(22) Filed: Jan. 9, 2003

(65) Prior Publication Data

US 2004/0139359 A1 Jul. 15, 2004

(51) Int. Cl.$^7$ .................................................. G06F 1/30
(52) U.S. Cl. ....................... 713/300; 713/320; 713/322; 713/324; 713/330; 713/340
(58) Field of Search .............................. 713/300, 322, 713/320, 324, 330, 340

(56) References Cited

U.S. PATENT DOCUMENTS

| | | | |
|---|---|---|---|
| 5,615,162 A | * | 3/1997 | Houston ..................... 365/226 |
| 5,835,435 A | * | 11/1998 | Bogin et al. ................. 365/227 |
| 6,215,714 B1 | * | 4/2001 | Takemae et al. ............ 365/222 |
| 6,252,816 B1 | * | 6/2001 | Mullarkey ................... 365/222 |
| 6,310,813 B1 | * | 10/2001 | Bae ............................. 365/222 |
| 6,418,535 B1 | * | 7/2002 | Kulakowski et al. ....... 713/320 |
| 6,421,281 B2 | * | 7/2002 | Suzuki ................... 365/189.09 |
| 6,633,987 B2 | * | 10/2003 | Jain et al. ................... 713/300 |
| 6,646,942 B2 | * | 11/2003 | Janzen ....................... 365/222 |
| 6,657,634 B1 | * | 12/2003 | Sinclair et al. ............. 345/534 |
| 6,665,806 B1 | * | 12/2003 | Shimizu ..................... 713/324 |
| 6,795,896 B1 | * | 9/2004 | Hart et al. .................. 711/118 |
| 6,820,209 B1 | * | 11/2004 | Culbert et al. ............. 713/501 |
| 6,845,432 B2 | * | 1/2005 | Maiyuran et al. .......... 711/154 |
| 6,848,058 B1 | * | 1/2005 | Sinclair et al. ............. 713/322 |
| 6,894,691 B2 | * | 5/2005 | Juenger ...................... 345/531 |

\* cited by examiner

*Primary Examiner*—A. Elamin
(74) *Attorney, Agent, or Firm*—David N. Tran

(57) ABSTRACT

When a processor in a computer system is placed in a low power mode, power consumption of the computer system may be further reduced by reducing power consumption of one or more components of a memory coupled to the processor and by reducing power consumption of one or more components of a controller device coupled to the memory. The processor and the controller device may share the memory.

20 Claims, 5 Drawing Sheets

POWER/PERFORMANCE OPTIMIZED MEMORY CONTROLLER CONSIDERING PROCESSOR POWER STATES

FIELD OF THE INVENTION

The present invention relates to the field of computer systems, more particularly relating to methods and apparatuses for reducing power consumption in computer systems.

BACKGROUND

Computer systems are pervasive in the world, including everything from small handheld electronic devices, such as personal data assistants and cellular phones, to application-specific electronic devices, such as set-top boxes, digital cameras, and other consumer electronics, to medium-sized mobile systems such as notebook, sub-notebook, and tablet computers, to desktop systems, workstations, and servers.

Over the last few years, there have been many advances in semiconductor technology that have resulted in the development of improved electronic devices having integrated circuits (IC) operating at higher frequencies and supporting additional and/or enhanced features. While these advances have enabled hardware manufacturers to design and build faster and more sophisticated computer systems, they have also imposed a disadvantage in higher power consumption, especially for battery-powered computer systems.

A variety of techniques are known for reducing the power consumption in computer systems. For example, the Advanced Configuration and Power Interface (ACPI) Specification (Rev. 2.0a, Mar. 31, 2002) sets forth information about how to reduce the dynamic power consumption of portable and other computer systems. With respect to processors used in computer systems, four processor power consumption modes (C0, C1, C2, and C3) are defined in the ACPI Specification. For example, when the processor 105 is executing instructions, it is in the C0 mode. The C0 mode is a high power consumption mode. When the processor 105 is not executing instructions or idle, it may be placed in one of the low power consumption modes C1, C2 or C3. An Operating System (OS) in the computer system may dynamically transition the idle processor 105 into the appropriate low power consumption mode.

The C1 power mode is the processor power mode with the lowest latency. The C2 power mode offers improved power savings over the C1 power mode. In the C2 power mode, the processor is still able to maintain the context of the system caches. The C3 power mode offers still lower power consumption compared to the C1 and C2 power modes, but has higher exit latency than the C2 and C1 power modes. In the C3 power mode, the processor 105 may not be able to maintain coherency of the processor caches with respect to other system activities.

While the reduced power consumption modes defined by the ACPI Specification and known techniques have many advantages, there is a continuing need for ways to further reduce the power consumption of computer systems, including power consumption of individual components such as, for example, a display, a disk drive, an integrated graphics processor, etc.

BRIEF DESCRIPTION OF THE DRAWINGS

The following drawings disclose various embodiments of the present invention for purposes of illustration only and are not intended to limit the scope of the invention.

DETAILED DESCRIPTION

Methods and systems are disclosed for controlling power consumption of computer systems. For one embodiment, when a processor of a computer system is in a low power mode, power consumption of one or more components of a memory coupled to the processor and of other system components that have controllers associated with making requests to the memory may be reduced.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are presented in terms of block diagrams and flowcharts to illustrate embodiments of the invention, and they may not be discussed in detail to avoid unnecessarily obscuring the understanding of this description.

As used herein, the term "when" may be used to indicate the temporal nature of an event. For example, the phrase "event 'A' occurs when event 'B' occurs" is to be interpreted to mean that event A may occur before, during, or after the occurrence of event B, but is nonetheless associated with the occurrence of event B. For example, event A occurs when event B occurs if event A occurs in response to the occurrence of event B or in response to a signal indicating that event B has occurred, is occurring, or will occur.

Figure 1:
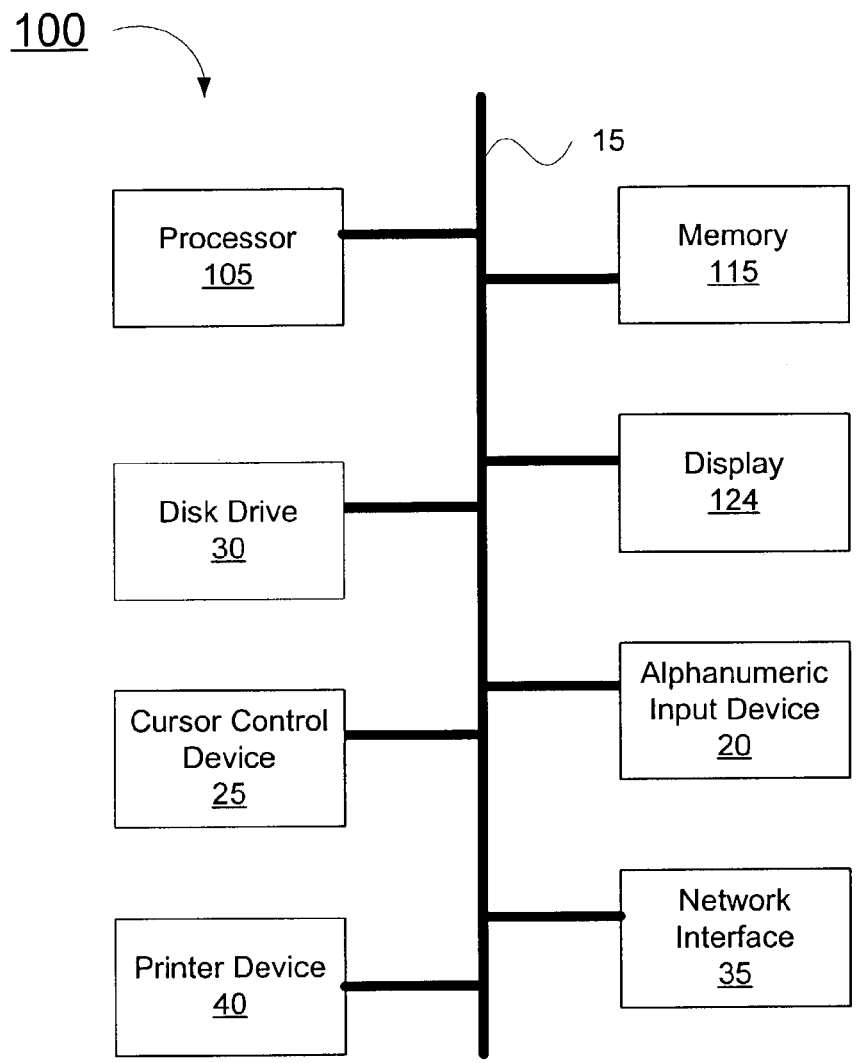
FIG. 1 is a block diagram illustrating an example of a computer system.

FIG. 1 is a block diagram illustrating an example of a computer system. The computer system 100 may include a central processing unit (CPU) or processor 105 and a system memory 115 that is coupled with the processor 105 via bus 15. The computer system 100 may include a display unit 124 (e.g., a liquid crystal display (LCD) or a cathode ray tube (CTR)). Data (e.g., text, graphics, etc.) displayed on the display unit 124 may be controlled by a graphics controller residing in a chipset (not shown). The computer system 100 may further include an alphanumeric input device 20 (e.g., a keyboard), a cursor control device 25 (e.g., a mouse) and a disk drive unit 30.

The disk drive unit 30 may include a machine-readable medium (not shown) on which is stored a set of instructions (e.g., software application) embodying any one, or all, of the embodiments described herein. The instructions may also reside, completely or at least partially, within the main memory 115 and/or within the processor 105. The instructions may furthermore be transmitted or received via the network interface device 35. The computer system 100 may also include a network interface 35 to connect to one or more networks. The computer system 100 may be powered by an alternating current (AC) power source or by a direct current (DC) power source using one or more batteries.

Although not shown, the bus 15 may include one or more of address bus, bus control signals and data bus and/or even a memory controller that arbitrates between all memory access requests. The processor 105 may control the bus 15 which means communications between input/output (I/O) devices (or slave devices) need involvement of the processor 105. Although not shown, there may be other controllers in the computer system 100 that are capable of taking turns with the processor 105 at making access requests to the memory 115. This may allow a controller to drive the address bus and the control signals of the bus 15 with minimal intervention by the processor 105. For example, the processor 105 may be busy performing other tasks that do not require the bus 15, or the processor 105 may be idle in a low power state. A controller may contain its own processor or microcontroller or engine that generates requests to the memory 115. A controller may be, for example, an Ethernet controller, a sound transducer controller, a universal serial bus (USB) controller, a graphics controller, etc.

In the following description, for purposes of explanation, an integrated graphics controller may be used as an example of a controller that is capable of controlling the bus 15 and accessing the memory 115 with minimal intervention by the processor 105. One skilled in the art will recognize that the description may also be applicable to other controllers.

Figure 2:
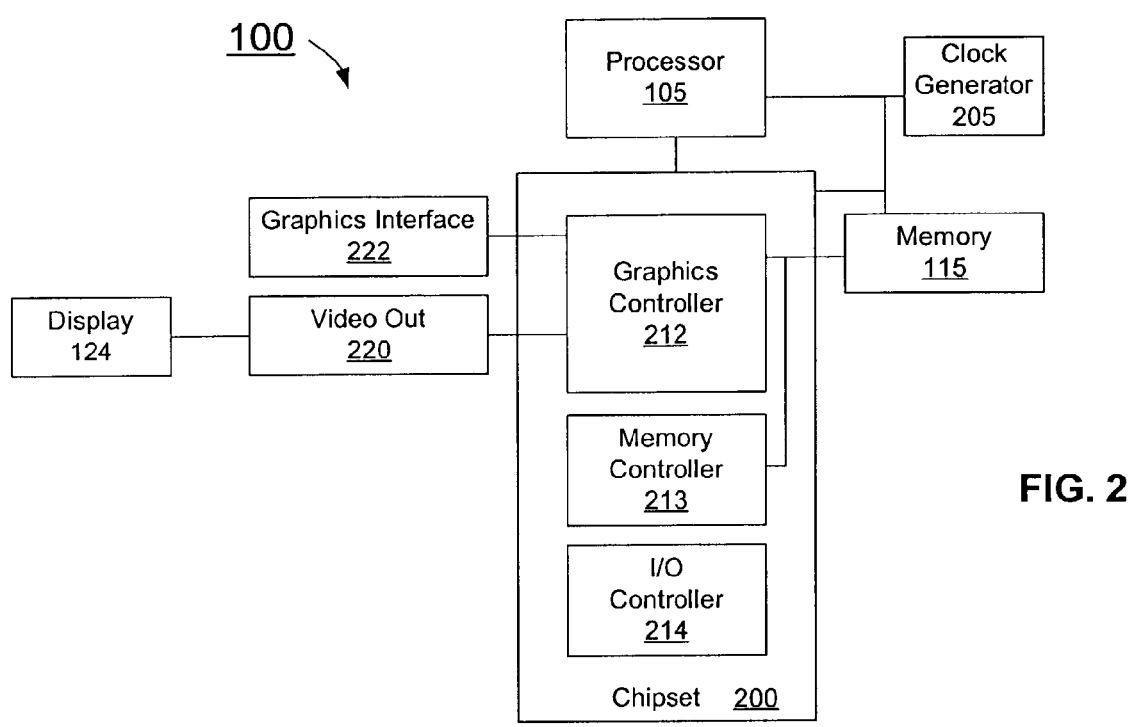
FIG. 2 is a block diagram illustrating an example of a chipset in a computer system, according to one embodiment.

FIG. 2 is a block diagram illustrating an example of a chipset in a computer system, according to one embodiment. The computer system 100 may include a central processor 105 and a chipset 200. The computer system 100 may also include a memory 115. The chipset 200 may be an integrated graphics chipset. The chipset 200 may, for example, be the Intel 845G integrated graphics chipset from Intel Corporation of Santa Clara, Calif. The chipset 200 may include an integrated graphics controller 212 to provide graphics/video support. The chipset 200 may also include a graphics interface 222 (e.g., Accelerated Graphics Port (AGP) interface) to support external graphics controllers (not shown) for advanced graphics capability. An external graphics controller may have own local memory.

The chipset 200 may also include a memory controller 213 that interfaces with the memory 115 to satisfy read/write requests from the processor 105. The memory 115 may be, for example, dynamic random access memory (DRAM), synchronous dynamic random access memory (SDRAM), double data rate (DDR) SDRAM, etc. The chipset 200 may also include an I/O controller 214 to interface with peripheral devices (not shown). Although FIG. 2 illustrates the processor 105 as a different module from the graphics controller 212, one or more of the processor 105, the graphics controller 212, and the I/O controller 214 may be implemented in one module or in multiple modules. For example, functionalities of the memory controller 213 may be integrated in the processor 105.

The graphics controller 212 and the memory 115 may receive reference clock signals from a clock generator 205. The graphics controller 212, the memory controller 213 and the memory 115 may also include delayed locked loop (DLL) circuit(s) (not shown) used, for example, to control timings, etc.

The graphics controller 212 may perform computations to get display data from the memory 115 and to output the display data to the display unit 124 via the video out port 220. The graphics controller 212 may also control other operational behaviors of the display unit 124 including, for example, refresh rates, backlight brightness and the like. The activities performed by the graphics controller 212 may contribute to the power consumed by the chipset 200 and by the system 100.

Figure 3:
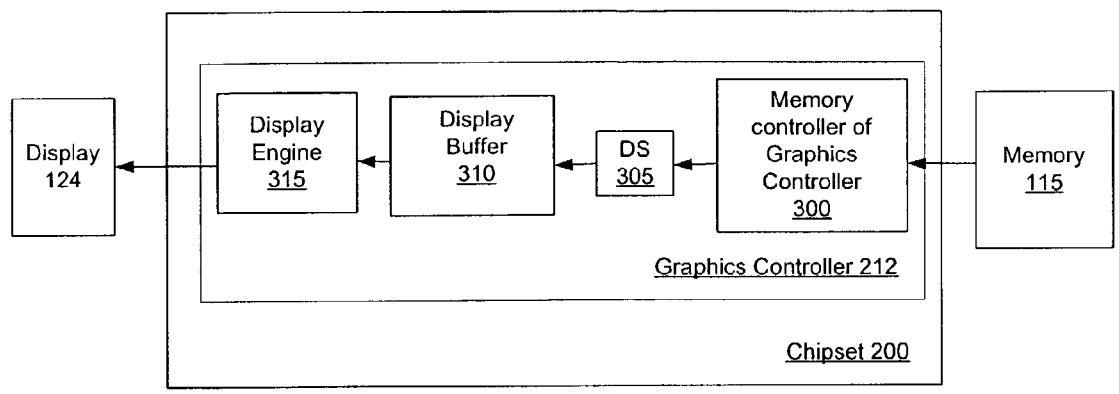
FIG. 3 is a block diagram illustrating an example of a graphics controller, according to one embodiment.

FIG. 3 is a block diagram illustrating an example of a graphics controller, according to one embodiment. The graphics controller 212 may include a display buffer 310 to store the display data. The display buffer 310 may be associated with a display streamer (DS) 305 that may be used to determine when to request the display data from the memory 115. The display buffer 310 may be a first-in first-out (FIFO) buffer. The display data may be fed from the display buffer 310 to a display engine 315. Although the example illustrated in FIG. 3 refers to the DS 305 as a separate component, it may be possible that the DS 305 and its functionalities may be incorporated elsewhere such as, for example, in the memory controller 300 of the graphics controller 212.

It may be noted that the graphics controller 212 and the memory controller 213 (illustrated in FIG. 2) (and thus the processor 105) may share the memory 115. That is, the graphics controller 212 may have its own memory controller 300 to initiate own accesses to the memory 115 without direct control of the processor 105. For example, considering a unified memory architecture (UMA) chipset with integrated graphics controller, in this case the memory controller 213 and the graphics controller 212 in the chipset 200 share the same memory 115, and the power consumption of the graphics controller 212 and the memory 115 may be reduced. When there is an external graphics controller (not shown) that has own local memory, the power consumption of the chipset 200, the memory 115, and the external graphics controller and its local memory may be reduced.

The memory 115 may be more efficient when it can provide the display data at a high rate. The display data, however, may only be processed by the display engine 315 at a lower rate. Breaks or interruptions in feeding the display data from the display buffer 310 to the display engine 315 may result in visual artifacts such as, for example, flickers or breaks in the final output on the display unit 124. As such, control values may need to be used. For example, the DS 305 may use a different set of control values for each display mode supported by the graphics controller 212. A display mode may include, for example, a combination of display device resolution, color depth or pixel depth, refresh rates, and system configuration.

The control values may allow the DS 305 to determine when to retrieve the display data and how much of the display data to retrieve from the memory 115. For example, the control values may include a watermark value and a burst length value. The watermark value may represent a value that falls between a minimum buffer value and a maximum buffer value, depending on the size of the buffer 310. The burst length value may represent the amount of display data that the DS 305 may request from the memory 115 at a time for a particular display mode. The DS 305 may use the watermark value and the burst length value to more efficiently control how and when the display data is fetched from the memory 115 and presented to the display engine 315 to display on the display unit 124. This may help eliminating visual artifacts or display corruption seen on the display unit 124.

The display buffer 310 may store up to a certain number of display data fetched from the memory 115. When the amount of display data in the display buffer 310 drops below the watermark value for the current display mode, the DS 305 requests more display data from the memory 115. It may be noted that other techniques other than using the water mark value and the burst length value to control when and how much display data to retrieve from the memory 115 may also be used.

The processor 105 illustrated in FIG. 2 may dynamically compute the watermark values and burst length values for different display modes that may result from different configurations of the computer system 100. A configuration may be, e.g., a particular combination of multiple displays, display resolutions, color depths, refresh rates, overlay scaling conditions, video capture conditions, and/or other system configurations. The processor 105 may program one of the watermark values as a current watermark value and one of the burst length values as a current burst length value into the graphics controller 212 for use in processing the display data to be displayed on the display unit 124.

During normal operation, the memory 115 may be in a memory refresh mode and its contents may be refreshed or recharged at every memory refresh interval, for example. For one embodiment, the memory 115 may include features that enable its components to refresh on their own (or self-refresh), independent from the processor 105 or external refresh circuits (not shown).

According to the ACPI Specification, when the processor 105 is not executing instructions, the power consumption by the computer system 100 may be reduced by placing the processor 105 in a low power mode such as, for example, the C3 power mode (or C2 or C1 power mode). When the processor 105 is in the low power mode (e.g., the C3 mode), the DS 305 may still need to fetch the display data from the memory 115 for display refresh based on the control values (e.g., the watermark value and the burst length value). This may occur when other controller may or may not desire to access memory 115. When all the controller devices' contributions to memory access latency can be taken into account, the techniques described herein may work when the processor 105 is in the C3 power mode or in the C2 power mode or also in the C1 power mode.

For one embodiment, when the processor 105 is in the low power mode, the memory 115 may also be placed in a low power mode. That is, power consumption of one or more components of the memory 115 may be reduced. This may have minimal effect on processor performance. For example, the power consumption of the memory 115 may be reduced by placing the memory 115 in a self-refresh mode. Self-refresh may be a dynamic random access memory (DRAM) power reduced state where the memory requires no input clock and attempts to only have power consumption required to keep its memory states. This may be done, for example, by issuing a self-refresh command to the memory 115. Placing the memory 115 into the self-refresh mode may enable its contents to be saved while reducing power consumption.

One skilled in the art may recognize that other techniques may also be used to place the memory 115 into the low power mode such as, for example, by placing the memory 115 in a pre-charge power-down or active power-down. Precharge power down is a DRAM power reduced state that still requires system clocking, and that all DRAM memory pages are closed before it can be entered. Active power down is a DRAM power reduced state that requires system clocking, but not all DRAM pages are closed before it can be entered. Generally, the lower power states may have longer powerup or wakeup latency times.

For one embodiment, when the processor 105 is placed into the low power mode, the power consumption of the memory 115 may be reduced by reducing power to a delay locked loop (DLL) circuit associated with the memory 115.

For one embodiment, when the power consumption of the memory 115 is reduced, the power consumption of one or more components of the graphics controller 212 may also be reduced. The one or more components of the graphics controller 212 may include components that are needed to run the memory 115. This may place the graphics controller 212 in a low power mode and may have minimal effect on processor performance. For example, this may include reducing power (such as shutting off the DLL) to a delay locked loop (DLL) circuit associated with the graphics controller 212, or shutting off the clocking to the memory from the graphics controller 212. Reducing power consumption as used herein may include powering off or reducing power from a current amount to a lower amount when applicable.

In order to reduce the overall power consumption of the computer system 100 as much as possible, it may be advantageous for the memory 115 and the graphics controller 212 to stay in the low power mode for as long as possible. Of course, at some point, waking up the memory 115 and the graphics controller 212 may be necessary to allow the computer system 100 to operate in an acceptable manner. For example, at some point the amount of display data in the display buffer 310 may be reduced to the watermark level and a memory burst is required. In this situation, it may be necessary to wake up the graphics controller 212 and the memory 115 and restore them to their normal power mode. Waking up as used herein may include powering on or increasing power from a low amount to a higher amount when applicable.

As described above, the watermark value may be used to determine when a memory burst is necessary, and the burst length value may be used to determine the amount of data to be fetched from the memory 115 each time. Typically, during normal processor power mode (e.g., C0 power mode), the memory bursts may be smaller and spaced closer in time. Thus, when the processor is in a low power mode (e.g., C1/C2/or C3), it may be advantageous to change the control values (e.g., the burst length value and the water mark value) so that the memory bursts may be longer and spaced further apart in time. Of course, this may depend on the current display mode and the size of the display buffer 310. Changing the control values may allow the wakeup latency time to be shorter than the time to process the display data in the display buffer 310. The wakeup latency time may include time to restore power to the one or more components of the memory 115 and of the graphics controller 212.

Figure 4:
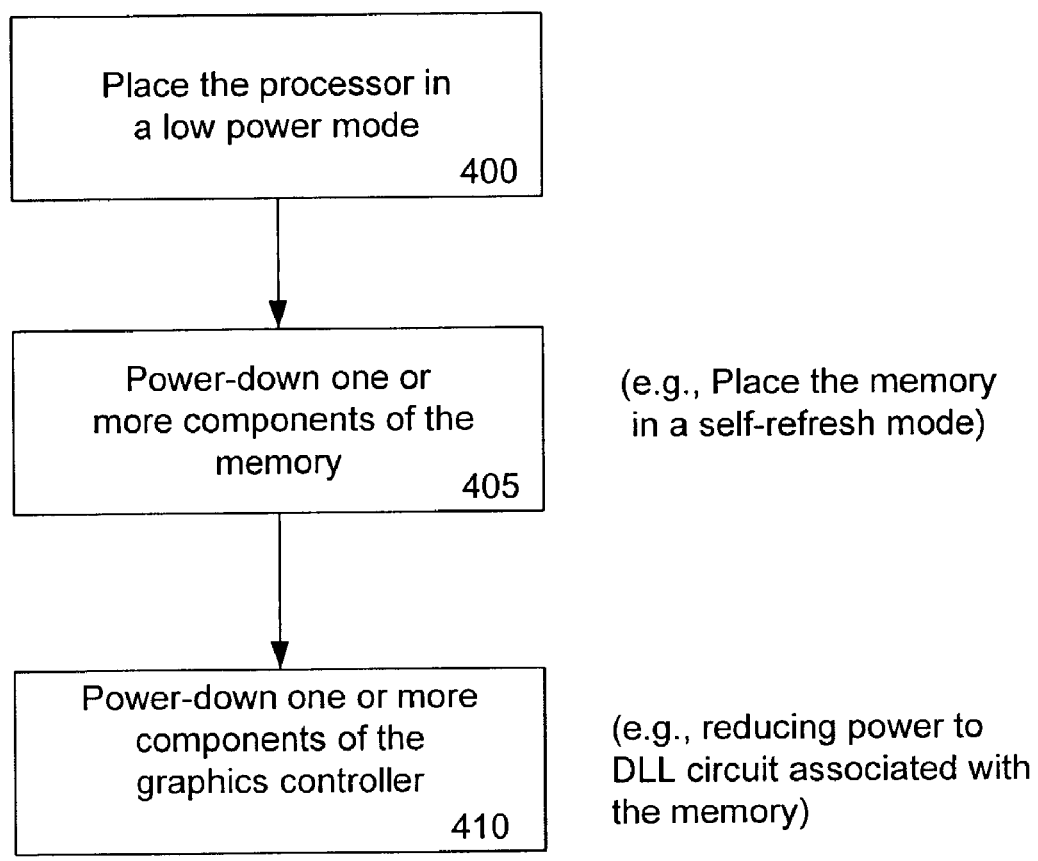
FIG. 4 is a flow diagram illustrating an example of a process used for reducing the power consumption of the memory and the graphics controller, according to one embodiment.

FIG. 4 is a flow diagram illustrating an example of a process used for reducing the power consumption of the memory and the graphics controller, according to one embodiment. At block 400, the processor 105 is placed in a low power mode. As described above, there may be wakeup latency associated with restoring the memory 115 to a normal power mode from a low power mode. It may be possible that when the processor 105 is placed in the low power mode, the buffer 310 may be partially populated with existing display data such that the wakeup latency time may be temporarily longer than the time to process the existing display data in the display buffer 310.

At a next memory burst, the display buffer 310 may be populated with more display data (e.g., as dictated by the burst length value), and the wakeup latency time may be shorter than the time it takes to process the display data now in the display buffer 310. This may allow the memory 115 to be in the low power mode for a longer time.

At block 405, the power consumption of one or more components of the memory 115 is reduced. Reducing the power consumption of one or more components of the memory 115 may include, for example, placing the memory 115 in a self-refresh mode. When the memory 115 is in a self-refresh mode, power to the DLL circuit associated with the memory 115 may be reduced.

At block 410, the power consumption of one or more components of the graphics controller 212 is reduced. This may include, for example, shutting down the clocks to memory and reducing the power consumption of the DLL circuit associated with the graphics controller.

Figure 5:
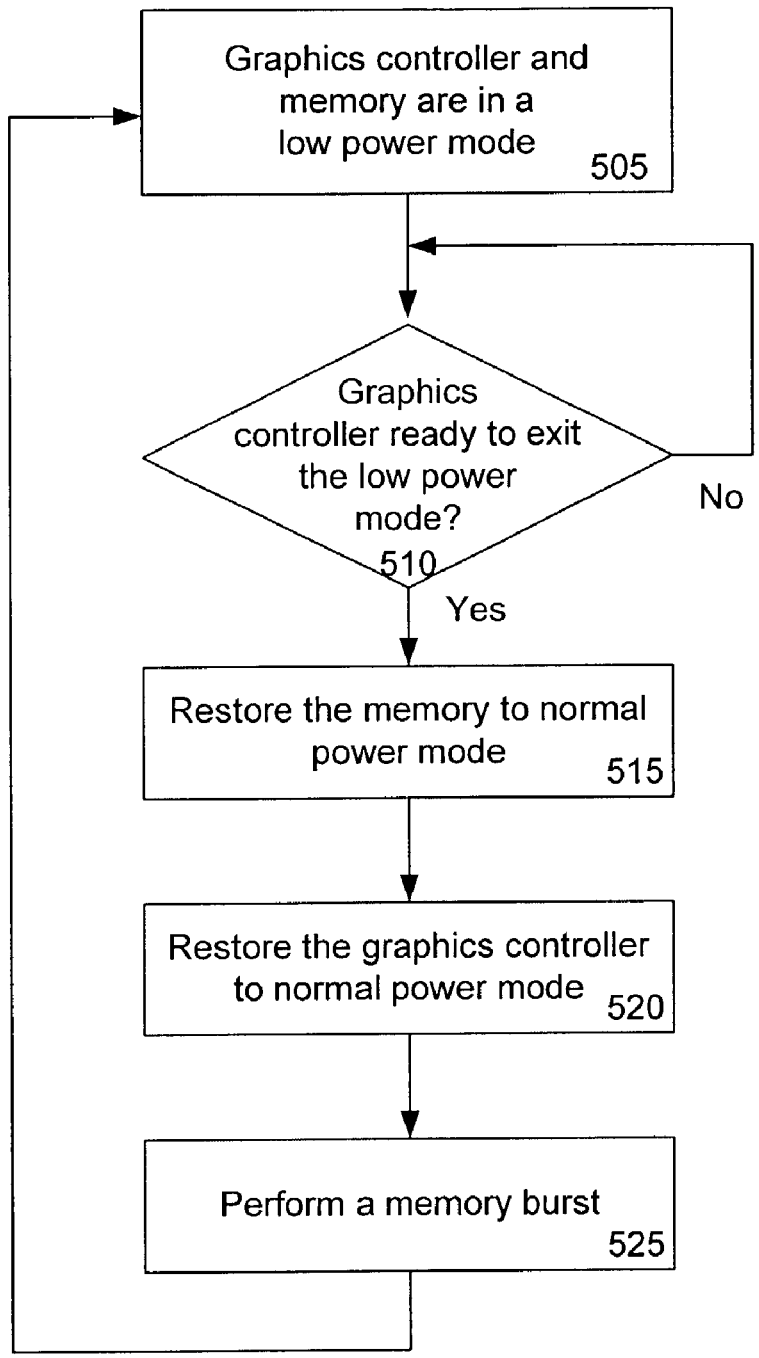
FIG. 5 is a flow diagram illustrating a process for restoring the memory and the graphics controller to a normal power mode, according to one embodiment.

FIG. 5 is a flow diagram illustrating a process for restoring the memory and the graphics controller to a normal power mode, according to one embodiment. At block 505, the graphics controller 212 is in a low power mode. At block 510, a test is performed to determine if the graphics controller 212 needs to exit the low power mode. For example, the test may verify if the watermark level has or has not been reached. The test may be performed so that the graphics controller 212 can exit the low power mode at an appropriate time before the powerup latency time is going to be longer than the already buffered display data can support. If the graphics controller 212 does not need to exit the low power mode, the process stays at block 510. Otherwise, the process flows to block 515.

At block 515, the power to the memory 115 is restored to the normal power mode. This may include, for example, taking the memory 115 out of the self-refresh mode and powering up the DLL circuit associated with the memory 115. At block 520, the power to the graphics controller 212 is restored to the normal power mode. This may include, for example, powering up the DLL circuit associated with the graphics controller 212. It may be noted that the graphics controller 212 may drift in and out of the low power mode. For example, the graphics controller 212 may be out of the low power mode when more display data is needed and a memory burst is to be performed, as shown in block 525.

When the control values (e.g., the burst length value and the watermark value) are used and they are changed to increase the time that the memory 115 and the graphics controller 212 stay in the low power mode, these control values may need to be restored to their original values normally used when the processor 105 is in the normal power mode. Note that it may be necessary to wait for the memory 115 and the graphics controller 212 to power up before taking the processor 105 out of the low power mode.

It may be noted that although the processes described in FIG. 4 and in FIG. 5 refer to the graphics controller 212, one skilled in the art will recognize that those processes may also be applicable to other controller devices that are capable of accessing the memory 115 independently of the processor 105. It may also be noted that although the techniques described above refer to display data, one skilled in the art will recognize that the techniques may also be used with any data including, for example, time critical data.

Techniques for reducing power consumption in computer systems have been disclosed. The power consumption of a computer system may be reduced when the processor is in a low power mode by reducing the power consumption of the memory and of a bus controller associated with the memory. Although the techniques described above refer generally to the graphics controller and the processor sharing the same memory, when the graphics controller has its own local memory, power consumption of the graphics controller may be managed using the same technique. In addition, although the techniques described above refer to reducing the power consumption of the DLL circuits of the memory 115 and of the graphics controller 212, the techniques may also be used to reduce power consumption of other components in the computer system 100.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method, comprising:
   when a processor is placed in a low power mode, reducing power consumption of one or more components of a memory coupled to the processor and of one or more components of a graphics controller needed to run the memory, wherein an amount of display data to be retrieved from the memory is determined based on a wakeup latency time associated with the memory and the graphics controller, and wherein time to process the display data retrieved from the memory is at least equal to the wakeup latency time.

2. The method of claim 1, wherein reducing the power consumption of the one or more components of the memory includes placing the memory in a self-refresh mode.

3. The method of claim 1, wherein reducing the power consumption of the one or more components of the memory includes placing the memory in a precharge powerdown mode or an active powerdown mode.

4. The method of claim 2, wherein reducing the power consumption of one or more components of the graphics controller needed to run the memory includes reducing power consumption of a delay locked loop (DLL) circuit associated with the graphics controller.

5. The method of claim 4, wherein reducing the power consumption of one or more components of the graphics controller needed to run the memory further includes reducing power of control signals and clocks associated with the graphics controller.

6. The method of claim 1, wherein the graphics controller and the processor share the memory.

7. The method of claim 1, further comprising:
   verifying that the graphics controller needs to exit a low power mode before increasing the power consumption of the one or more components of the graphics controller.

8. A computer readable medium comprising executable instructions which, when executed in a processing system, causes the processing system to perform a method, comprising:
   when a processor is placed in a low power mode, reducing power consumption of one or more components of a memory coupled to the processor and of one or more components of a graphics controller sharing the memory with the processor, wherein an amount of display data to be retrieved from the memory is determined based on a wakeup latency time associated with the memory and the graphics controller, and wherein time to process the amount of display data retrieved from the memory is at least equal to the wakeup latency time.

9. The computer readable medium of claim 8, wherein reducing the power consumption of the one or more components of the memory includes placing the memory in a self-refresh mode, a precharge powerdown mode, or an active powerdown mode.

10. The computer readable medium of claim 9, wherein placing the memory in a self-refresh mode includes reducing power consumption of a delay locked loop (DLL) circuit associated with the memory.

11. The computer readable medium of claim 10, wherein reducing the power consumption of one or more components of the graphics controller includes reducing power consumption of a delay locked loop (DLL) circuit associated with the graphics controller.

12. The computer readable medium of claim 11, wherein reducing the power of the one or more components of the graphics controller further includes reducing the power of control signals and clocks associated with the graphics controller.

13. The computer readable medium of claim 8, wherein the one or more components of the graphics controller includes components needed to run the memory.

14. The computer readable medium of claim 13, further comprising:
  verifying that the graphics controller needs to exit a low power mode before subsequently restoring the power consumption of the one or more components of the graphics controller.

15. A system comprising:
  a processor;
  a memory coupled to the processor; and
  a graphics controller coupled to the processor and to the memory, wherein the graphics controller and the processor share the memory, and wherein an amount of display data to be retrieved from the memory is determined based on a wakeup latency time associated with the memory and the graphics controller, and wherein time to process the display data retrieved from the memory is at least equal to the wakeup latency time.

16. The system of claim 15, wherein the one or more components of the memory includes a delay locked loop (DLL) circuit associated with the memory.

17. The system of claim 15, wherein the one or more components of the graphics controller includes a delay locked loop (DLL) circuit associated with the graphics controller.

18. The system of claim 15, wherein the power consumption of the one or more components of the memory is reduced by placing the memory in a self-refresh mode.

19. The system of claim 15, wherein the power consumption of the memory and of the graphics controller is subsequently increased when it is necessary to retrieve the display data from the memory.

20. The system of claim 15, wherein the one or more components of the graphics controller are needed to run the memory.

* * * * *